United States Patent
Ebert et al.

(10) Patent No.: US 8,613,576 B2
(45) Date of Patent: Dec. 24, 2013

(54) INDEXABLE CUTTING INSERT

(75) Inventors: Guenter Ebert, Lichtenau/Ansbach (DE); Armin Kretschmer, Schwabach (DE)

(73) Assignee: Kennametal Inc., Latrobe, PA (US)

( * ) Notice: Subject to any disclaimer, the term of this patent is extended or adjusted under 35 U.S.C. 154(b) by 306 days.

(21) Appl. No.: 13/002,785

(22) PCT Filed: Jun. 19, 2009

(86) PCT No.: PCT/EP2009/004450
§ 371 (c)(1),
(2), (4) Date: Jan. 25, 2011

(87) PCT Pub. No.: WO2010/017859
PCT Pub. Date: Feb. 18, 2010

(65) Prior Publication Data
US 2011/0116878 A1    May 19, 2011

(30) Foreign Application Priority Data
Aug. 14, 2008  (DE) .......................... 10 2008 037 915

(51) Int. Cl.
*B23C 5/20*       (2006.01)
(52) U.S. Cl.
CPC ...................................... *B23C 5/20* (2013.01)
USPC ................ 407/113; 407/40; 407/42; 407/114
(58) Field of Classification Search
USPC ............ 407/40, 47, 48, 61, 62, 113, 114, 119
See application file for complete search history.

(56) References Cited

U.S. PATENT DOCUMENTS

| | | | |
|---|---|---|---|
| 1,460,030 A | 6/1923 | Mattson |
| 1,838,520 A | 12/1931 | Archer |
| 2,392,216 A | 1/1946 | Anania |
| 2,630,725 A | 3/1953 | Black |
| 3,213,716 A | 10/1965 | Getts |
| 3,408,722 A | 11/1968 | Berry, Jr. |
| 3,629,919 A | 12/1971 | Trevarrow, Jr. |
| 3,831,237 A | 8/1974 | Gunsalus |
| 3,842,470 A | 10/1974 | Hertel |
| 3,875,663 A | 4/1975 | Gustafson |

(Continued)

FOREIGN PATENT DOCUMENTS

| CN | 1623709 A | 6/2005 |
|---|---|---|
| DE | 3321184 A1 | 12/1984 |

(Continued)

OTHER PUBLICATIONS

English machine translation of DE 10 2005 025 815.*
English machine translation of DE 10 2006 011 581.*
PCT/US2010/055247: International Search Report dated Jul. 21, 2011 (10 pages).

*Primary Examiner* — Andrea Wellington
*Assistant Examiner* — Alan Snyder
(74) *Attorney, Agent, or Firm* — Larry R. Meenan, Esq.

(57) ABSTRACT

The invention relates to a cutting insert having two working surfaces facing away from each other and having a through hole extending between the working surfaces for receiving a fastening bolt, having a peripheral cutter rim having a cutting edge on each working surface and a central recess surrounded annularly by the cutter rim, having a number of segment-like molded parts corresponding to the number of different cutter positions of a working surface, for positioning the cutting insert in the corresponding cutting position.

11 Claims, 9 Drawing Sheets

(56) References Cited

U.S. PATENT DOCUMENTS

| | | |
|---|---|---|
| 3,946,474 A | 3/1976 | Hahn et al. |
| 3,996,651 A * | 12/1976 | Heaton et al. ............... 407/104 |
| 4,189,264 A | 2/1980 | Kraemer |
| 4,202,650 A | 5/1980 | Erickson |
| 4,304,509 A | 12/1981 | Mori |
| 4,315,706 A | 2/1982 | Erkfritz |
| 4,632,593 A | 12/1986 | Stashko |
| 4,636,116 A | 1/1987 | Shikata |
| 4,812,087 A | 3/1989 | Stashko |
| 4,880,338 A | 11/1989 | Stashko |
| 4,915,548 A | 4/1990 | Fouquer et al. |
| 4,934,844 A | 6/1990 | Orii |
| 5,046,899 A | 9/1991 | Nishi |
| 5,147,158 A | 9/1992 | Riviere |
| 5,199,828 A | 4/1993 | Forsberg et al. |
| 5,236,288 A | 8/1993 | Flueckiger |
| 5,275,633 A | 1/1994 | Johansson et al. |
| 5,346,336 A | 9/1994 | Rescigno |
| D363,727 S | 10/1995 | DeRoche |
| 5,478,175 A | 12/1995 | Kraemer |
| 5,542,794 A | 8/1996 | Smith et al. |
| 5,558,142 A | 9/1996 | Ehrle et al. |
| 5,658,100 A | 8/1997 | Deiss et al. |
| 5,702,210 A | 12/1997 | Boianjiu |
| D390,578 S | 2/1998 | Satran et al. |
| 5,716,167 A | 2/1998 | Siddle et al. |
| 5,733,073 A | 3/1998 | Zitzlaff et al. |
| 5,772,365 A | 6/1998 | Vogel et al. |
| 5,772,366 A | 6/1998 | Wiman et al. |
| 5,810,518 A | 9/1998 | Wiman et al. |
| 5,827,016 A | 10/1998 | Strand |
| 5,836,723 A | 11/1998 | Von Haas et al. |
| 5,846,032 A | 12/1998 | Murakami |
| 5,888,029 A | 3/1999 | Boianjiu |
| 5,931,613 A | 8/1999 | Larsson |
| 5,934,844 A | 8/1999 | Woolley |
| D416,917 S | 11/1999 | Xie et al. |
| 6,050,751 A | 4/2000 | Hellstrom |
| 6,053,671 A | 4/2000 | Stedt et al. |
| 6,126,366 A | 10/2000 | Lundblad |
| 6,152,658 A | 11/2000 | Satran et al. |
| 6,158,928 A | 12/2000 | Hecht |
| 6,164,878 A | 12/2000 | Satran et al. |
| 6,168,356 B1 | 1/2001 | Sjöö et al. |
| D442,193 S | 5/2001 | Isaksson |
| 6,224,300 B1 | 5/2001 | Baxivanelis et al. |
| 6,234,724 B1 | 5/2001 | Satran et al. |
| 6,238,133 B1 | 5/2001 | DeRoche et al. |
| 6,343,898 B1 | 2/2002 | Sjöö et al. |
| 6,508,612 B1 | 1/2003 | Baca |
| 6,543,970 B1 * | 4/2003 | Qvarth et al. ............... 407/114 |
| 6,579,042 B1 | 6/2003 | Shiraiwa |
| D477,004 S | 7/2003 | Arvidsson |
| 6,607,335 B2 | 8/2003 | Morgulis |
| 6,840,716 B2 | 1/2005 | Morgulis et al. |
| 6,926,472 B2 | 8/2005 | Arvidsson |
| 6,929,428 B1 | 8/2005 | Wermeister et al. |
| 6,948,889 B2 | 9/2005 | Arvidsson |
| 7,021,871 B2 | 4/2006 | Arvidsson et al. |
| D523,039 S | 6/2006 | Niebauer et al. |
| 7,070,363 B2 | 7/2006 | Long, II et al. |
| 7,073,987 B2 | 7/2006 | Hecht |
| 7,121,771 B2 | 10/2006 | Englund |
| 7,156,006 B2 | 1/2007 | Hyatt et al. |
| 7,168,895 B2 | 1/2007 | Koskinen et al. |
| 7,300,232 B2 | 11/2007 | Wiman et al. |
| 7,306,409 B2 | 12/2007 | Stabel et al. |
| 7,325,471 B2 | 2/2008 | Massa et al. |
| 7,381,015 B2 | 6/2008 | Jonsson |
| 7,387,474 B2 | 6/2008 | Edler et al. |
| 7,390,149 B2 | 6/2008 | Wihlborg |
| 7,407,348 B2 | 8/2008 | Sjogren et al. |
| 7,458,753 B1 | 12/2008 | Niebauer et al. |
| 7,476,061 B2 | 1/2009 | Edler |
| 7,513,717 B2 | 4/2009 | Engström et al. |
| 7,530,769 B2 | 5/2009 | Kress et al. |
| 7,578,639 B2 | 8/2009 | Wiman et al. |
| 7,604,441 B2 | 10/2009 | Bhagath |
| 7,607,867 B2 | 10/2009 | Benson |
| 7,607,868 B2 | 10/2009 | Noggle |
| 7,722,297 B2 | 5/2010 | Dufour et al. |
| 7,785,045 B2 | 8/2010 | Viol |
| D638,452 S | 5/2011 | Morrison et al. |
| D640,717 S | 6/2011 | Morrison et al. |
| 7,959,383 B2 | 6/2011 | Choi et al. |
| 8,096,735 B2 | 1/2012 | Sladek et al. |
| D658,218 S | 4/2012 | Morrison et al. |
| 8,147,171 B2 | 4/2012 | Dufour et al. |
| D673,194 S | 12/2012 | Kovac et al. |
| 8,430,607 B2 | 4/2013 | Jansson |
| 2003/0086766 A1 | 5/2003 | Andras |
| 2003/0219319 A1 | 11/2003 | Arvidsson |
| 2004/0028486 A1 | 2/2004 | Englund |
| 2005/0019110 A1 | 1/2005 | Astrakhan |
| 2005/0019113 A1 | 1/2005 | Wermeister |
| 2005/0084342 A1 | 4/2005 | Festeau et al. |
| 2005/0152754 A1 * | 7/2005 | Wiman et al. ............... 407/103 |
| 2005/0244233 A1 | 11/2005 | Jonsson |
| 2006/0088390 A1 | 4/2006 | Wallstrom et al. |
| 2006/0147280 A1 * | 7/2006 | Sjogren et al. ............... 407/113 |
| 2006/0245837 A1 | 11/2006 | Dufour et al. |
| 2006/0269374 A1 | 11/2006 | Dufour et al. |
| 2007/0009334 A1 | 1/2007 | Edler |
| 2007/0071559 A1 | 3/2007 | Koskinen |
| 2007/0122242 A1 | 5/2007 | Englund et al. |
| 2007/0189862 A1 | 8/2007 | Viol |
| 2007/0245535 A1 | 10/2007 | Noggle |
| 2008/0056831 A1 | 3/2008 | Wiman |
| 2008/0181731 A1 | 7/2008 | Wallstrom et al. |
| 2008/0193233 A1 | 8/2008 | Park |
| 2008/0317558 A1 | 12/2008 | Niebauer et al. |
| 2009/0052998 A1 | 2/2009 | Sladek et al. |
| 2009/0097929 A1 | 4/2009 | Festeau et al. |
| 2009/0290946 A1 | 11/2009 | Zastrozynski |
| 2010/0034602 A1 | 2/2010 | Sung et al. |
| 2010/0061816 A1 | 3/2010 | Koerner et al. |
| 2010/0158620 A1 | 6/2010 | Spitzenberger et al. |
| 2010/0183386 A1 | 7/2010 | Heinloth et al. |
| 2010/0239379 A1 | 9/2010 | Choi et al. |
| 2010/0247257 A1 | 9/2010 | Paul et al. |
| 2011/0103905 A1 | 5/2011 | Morrison et al. |
| 2011/0116878 A1 | 5/2011 | Ebert et al. |
| 2011/0164934 A1 | 7/2011 | Chen et al. |
| 2012/0003493 A1 | 1/2012 | Schon et al. |
| 2012/0251250 A1 | 10/2012 | Morrison et al. |

FOREIGN PATENT DOCUMENTS

| | | |
|---|---|---|
| DE | 4244316 A1 | 6/1994 |
| DE | 19506944 A1 | 8/1995 |
| DE | 69901623 T2 | 11/2002 |
| DE | 102005025815 A1 * | 12/2006 |
| DE | 10 2006 011 581 A1 | 9/2007 |
| DE | 102008037915 B3 | 8/2009 |
| DE | 102009049088 A1 | 4/2011 |
| EP | 300172 A2 | 1/1989 |
| EP | 0599393 A1 | 6/1994 |
| EP | 698437 A1 | 2/1996 |
| EP | 730926 A1 | 9/1996 |
| EP | 1468770 A1 | 10/2004 |
| EP | 1535681 A1 | 6/2005 |
| JP | 63142944 A | 6/1988 |
| JP | 7299633 A | 11/1995 |
| JP | 1119817 A | 4/1999 |
| JP | 11245105 A | 9/1999 |
| JP | 1310808 A | 11/1999 |
| KR | 1020060019993 A | 3/2006 |
| SE | 533249 C2 | 7/2010 |
| WO | 9415741 A1 | 7/1994 |

(56) References Cited

FOREIGN PATENT DOCUMENTS

| WO | 0128722 | A1 | 4/2001 |
| WO | 2005068116 | A1 | 7/2005 |
| WO | 2007037733 | A1 | 4/2007 |
| WO | 2007104275 | A1 | 9/2007 |
| WO | 2007127109 | A2 | 11/2007 |
| WO | 2008029964 | A1 | 3/2008 |
| WO | 2010017859 | A1 | 2/2010 |

* cited by examiner

INDEXABLE CUTTING INSERT

BACKGROUND OF THE INVENTION a) Field of the Invention

The present invention relates to an indexable cutting insert, an insert seat for an indexable cutting insert and a cutting tool having an insert seat and an indexable cutting insert.

b) Description of the Related Art

Such indexable cutting inserts can be of one-sided or double-sided design. In a one-sided indexable cutting insert, as is known, for example, from WO 2007/127109 A1, a main face of the indexable cutting insert is configured as a working surface. The working surface has a plurality of cutting edges at its rim. If the effective cutting edge has become worn after a predetermined number of machining operations, the cutting insert is rotated in the insert seat, such that the next lip is used. Such indexable cutting inserts can be designed to be, for example, triangular, square or hexagonal and then correspondingly have three, four or six lips, which are used one after the other.

As a further embodiment, double-sided indexable cutting inserts are known, for example from WO 2007/037733 A1. In these indexable cutting inserts, both insert surfaces are designed as working surfaces and each have cutting edges at their rims. During the machining, first of all the one working surface forms the active machining surface, while the surface facing away from this machining surface is inactive and rests on the supporting surface of the insert seat. First of all, in these indexable cutting inserts, the cutting edges of the active machining surface become worn one after the other as in a one-sided indexable cutting insert. If the lips of the active machining surface have become worn, the indexable cutting insert is rotated by 180° in the insert seat, such that the worn machining surface rests on the supporting surface and the inactive surface resting previously on the supporting surface becomes the active machining surface. The cutting edges of this active machining surface also become worn one after the other.

Finally, a further double-sided indexable cutting insert is known from WO 2007/104275 A1. This cutting insert has a lip rim having a positive rake angle, said lip rim adjoining the cutting edge. Adjoining the lip rim is a falling surface which extends conically about the central through-hole. The advantage of this indexable cutting insert lies in the fact that inaccuracies when tightening the fastening bolt can be compensated for by the conical region.

With such double-sided indexable cutting inserts there is the problem of configuring the insert seat in such a way that the indexable cutting insert rests securely and fixedly in the insert seat and can be securely clamped there, but without damaging the cutting edges facing the supporting surface or those regions of the inactive working surface of the indexable cutting insert which are near the lip, said working surface facing the supporting surface of the insert seat. In particular, it is desirable to be as free as possible with regard to the configuration of the geometry of the cutting edges and of the chip breakers.

The object of the present invention is therefore to design an indexable cutting insert which can be positioned and clamped in the insert seat in an effective and dimensionally accurate manner and whose lip geometry and whose regions near the lip can be designed as freely as possible and so as to be adapted to the respective application.

SUMMARY OF THE INVENTION

The indexable cutting insert according to the invention first of all has a circumferential lip rim. A cutting edge is formed on the lip rim. In addition, the lip rim can have chip breakers or similar cutting aids.

A hollow is provided inside the circumferential lip rim. This hollow is provided with a number of segment-like molded bodies corresponding to the number of the different cutting positions of a working surface. Finally, a through-hole passes through the working surface. A fastening bolt, preferably a fastening screw, with which the indexable cutting insert can be fixed and clamped to the tool in the insert seat, can be inserted into the through-hole. The indexable cutting insert according to the invention has two working surfaces, facing away from one another, of the type mentioned at the beginning on the main faces of its parent body.

The molded bodies can be designed, on the one hand, as hollow bodies, that is to say as recesses, and, on the other hand, as solids, that is to say as projections. They thus form a negative or positive relief. Corresponding molded body receptacles designed to be at least partly complementary to the molded bodies must be provided on the insert seat. For example, it is possible to configure the molded bodies as prismatic projections. It then suffices to provide corresponding walls on the insert seat, and side walls of the prismatic projections bear against said walls in order to securely position the indexable cutting insert in its respective cutting position. The molded bodies then serve solely for the positioning and as a supporting surface of the indexable cutting insert, such that the actual lips can be designed completely independently of these positioning aids.

It is advantageous for each of the molded bodies to be of identical configuration and to attach them like a relief ring to the surface of the hollow. In this way, the molded bodies arranged next to one another form a structure like a spur gear which has a constant pitch. If a molded body adjacent to a molded body in engagement with the molded body receptacle is brought into engagement with the molded body receptacle, the indexable cutting insert is indexed, as it were, by one pitch interval and thus the next lip is activated.

As already stated, it is possible with the invention to provide chip breakers or similar cutting aids in the region of the lip rim. For example, a ring consisting of a CBN or PCD cutting material can be brazed or adhesively bonded in place as a cutting aid. The possibility of also providing the indexable cutting insert with two differently configured working surfaces is especially advantageous, such that various cutting tasks or, for example, a rough machining operation and a subsequent finish machining operation can be realized with the same indexable cutting insert.

BRIEF DESCRIPTION OF THE DRAWINGS

The invention is explained in more detail with reference to the exemplary embodiment shown in the figures. In the drawing:

FIG. 5a shows an indexable cutting insert resting in the insert seat, FIG. 5b shows the section V-V in FIG. 5a, FIG. 6a shows an indexable cutting insert resting in an insert seat, FIG. 6b shows the section VI-VI from FIG. 6a, FIG. 7a shows an indexable cutting insert resting in the insert seat, FIG. 7b shows the section VII-VII shown in FIG. 7a, FIG. 8 shows a sectional illustration of a first embodiment of an indexable cutting insert resting in the insert seat.

DETAILED DESCRIPTION OF THE INVENTION

Figure 1:
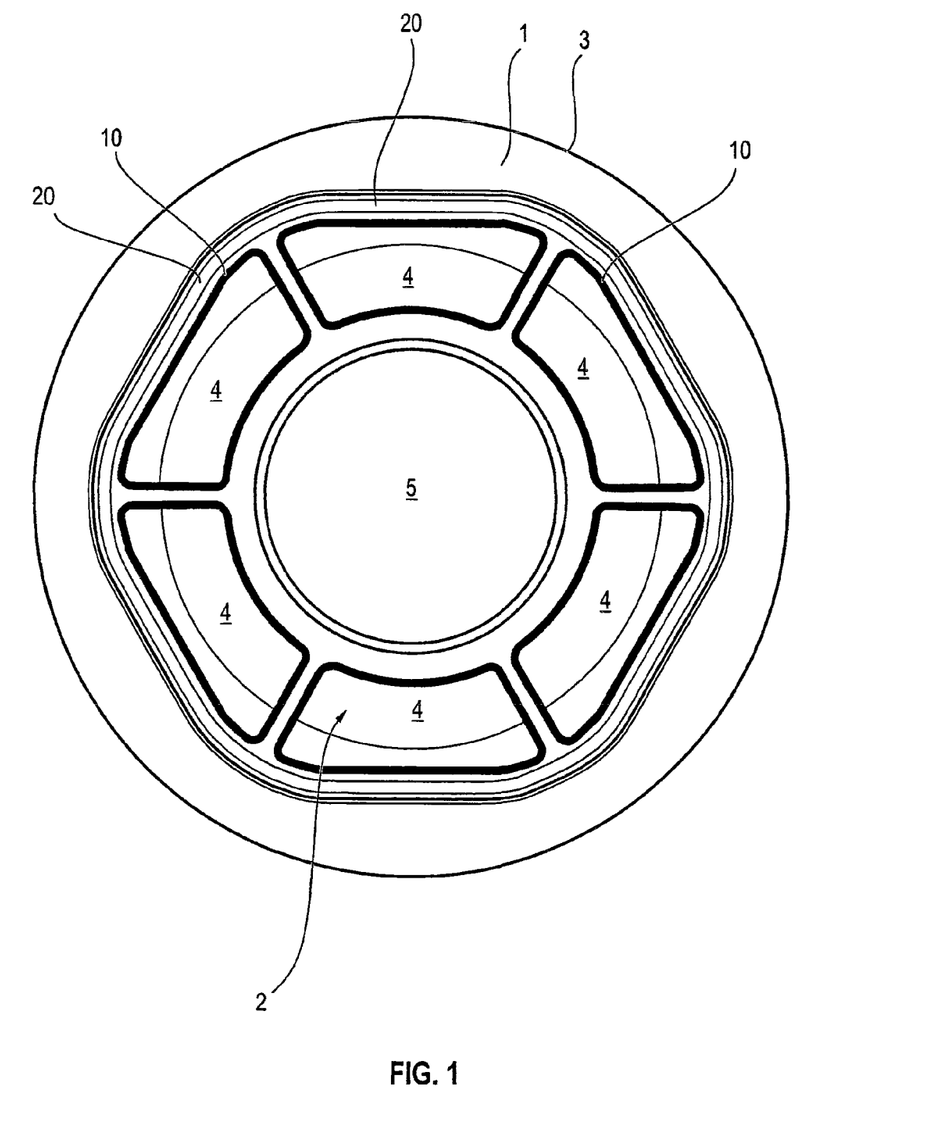
FIG. 1 shows the plan view of a working surface of an indexable cutting insert according to the invention.

The indexable cutting insert shown greatly enlarged in FIG. 1 has first of all the circumferential lip rim 1 and a hollow 2. In the exemplary embodiment, the lip rim 1 is defined by a virtually circular line which forms a circumferential cutting edge 3. Six trapezoidal molded bodies 4 are provided next to one another like a relief in the hollow 2. The molded bodies 4 are exactly the same size and project from the hollow 2. As a result of their constant pitch, the molded bodies 4 form indexing for the indexable cutting insert in the insert seat. Chip breakers of various configuration or, for example, a ring of CBN or PCD cutting material that is adhesively bonded or brazed in place can be provided as a cutting aid in the region of the lip rim 1.

Figure 2:
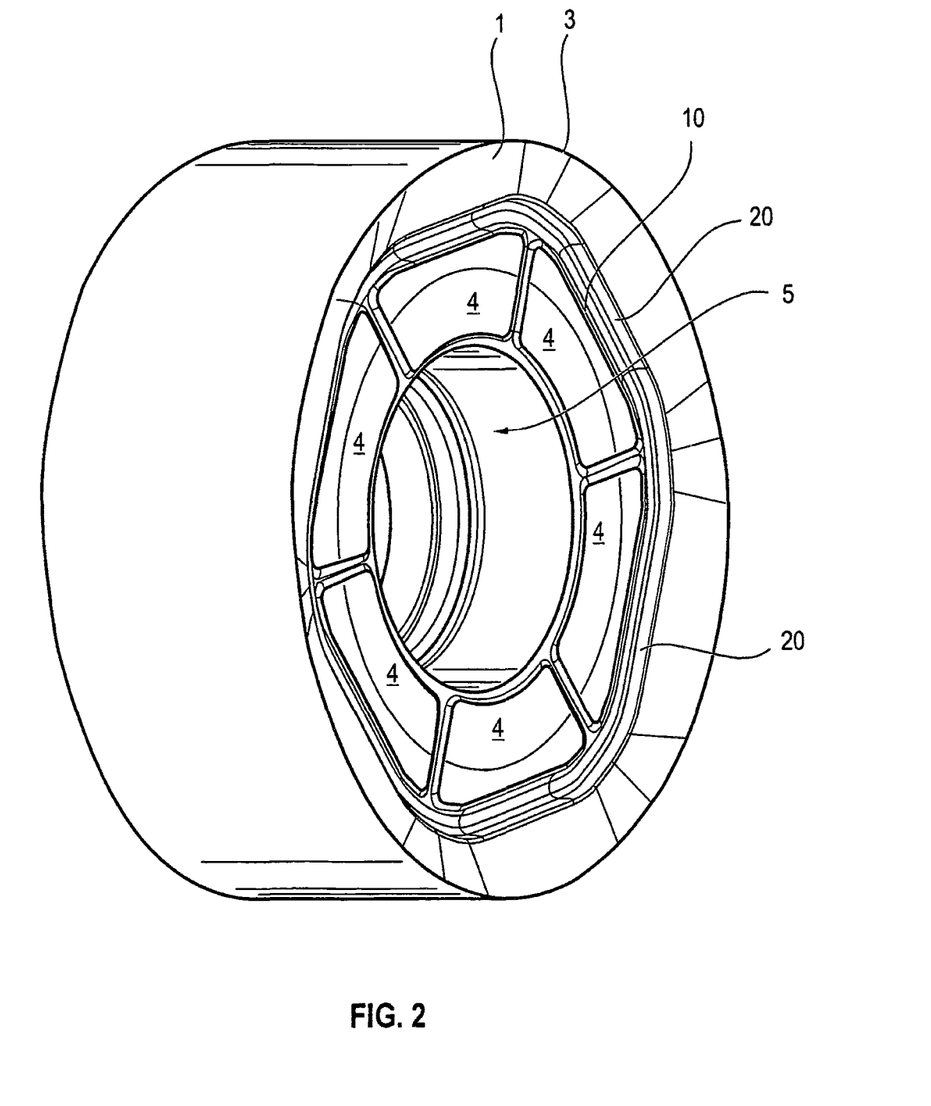
FIG. 2 shows the perspective view of the indexable cutting insert shown in FIG. 1.
Figure 3:
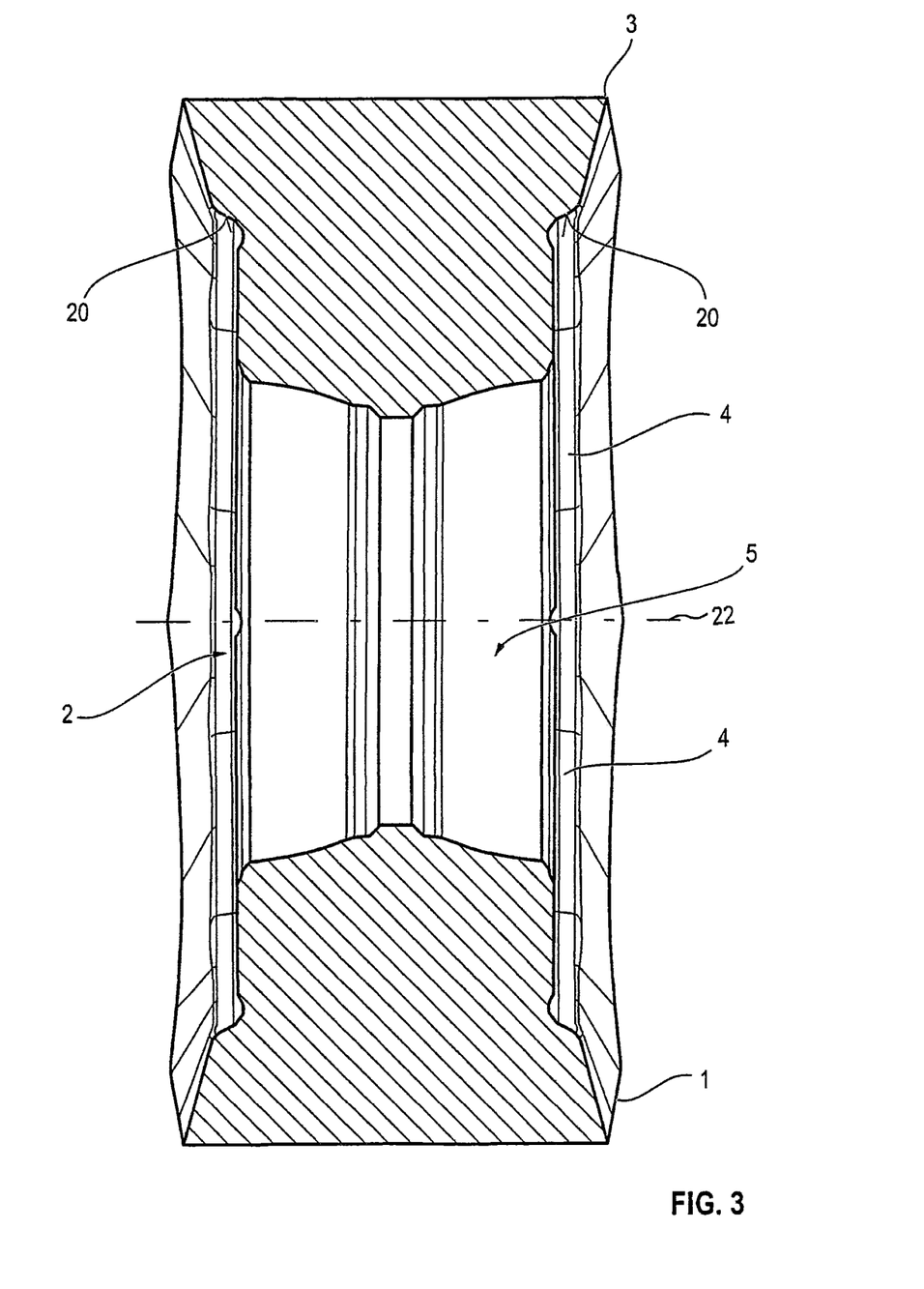
FIG. 3 shows a sectional view through the circumference of the indexable cutting insert shown in FIG. 1.
Figure 4:
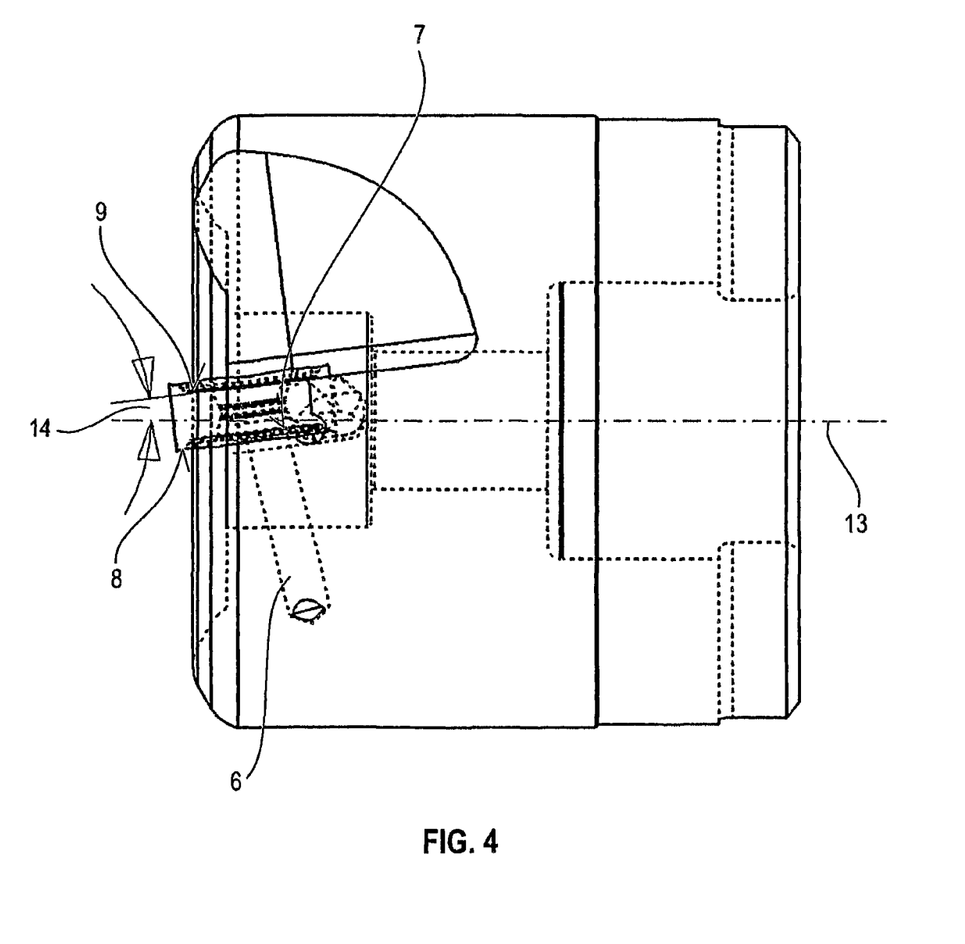
FIG. 4 shows a view of the insert seat.
Figures 5A, 5B:
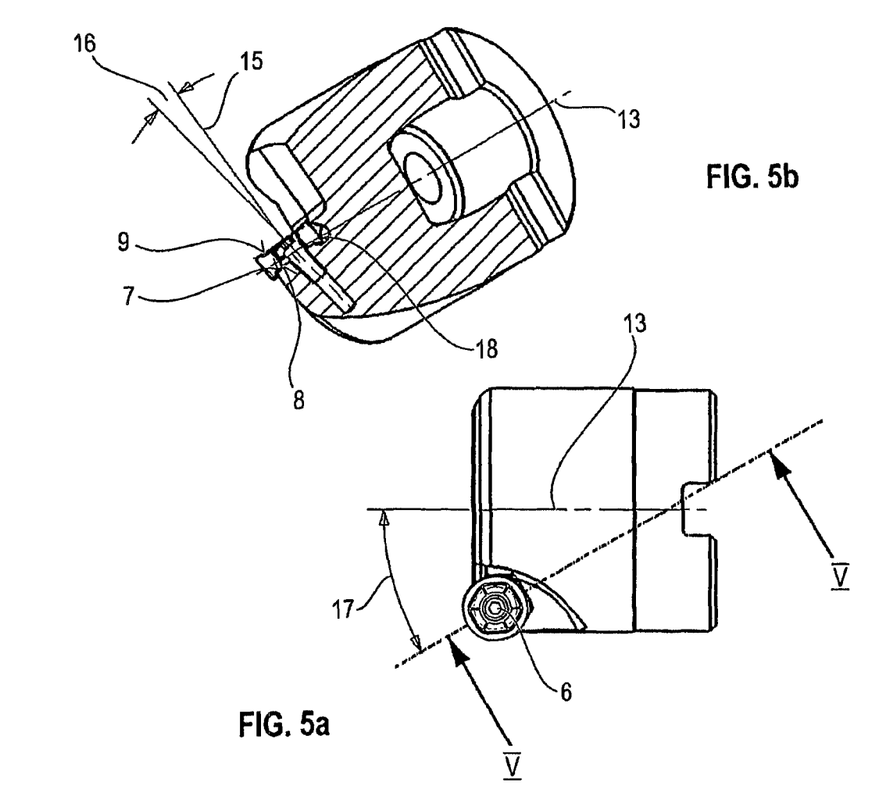

The through-hole 5 passing through the parent body of the cutting insert can be seen especially clearly in FIG. 2. The through-hole 5 extends concentrically to its center line 22, which can be seen in the illustration in FIG. 3. In the final fitted state of the indexable cutting insert, a fastening bolt preferably configured as fastening screw 6 is pushed through the through-hole 5 for fixing the indexable cutting insert in the insert seat. The fastening screw 6 then runs concentrically to the center line 22 of the through-hole 5. In the exemplary embodiment, the flat surfaces of the molded bodies 4 are arranged in one plane and extend at an angle of 90° to the center line 22 of the through-hole 5.

It can be seen in the exemplary embodiment that the indexable cutting insert is configured as a cylindrical body, but this need not necessarily be the case. Here, the two top surfaces of the cylinder are configured as working surfaces. The working surface resting on the supporting surface 7 of the insert seat forms the inactive positioning surface 8 of the indexable cutting insert. The machining surface 9 faces diametrically away from this positioning surface 8 of the indexable cutting insert. During the cutting operation, the machining surface 9 is in engagement with the workpiece, while the indexable cutting insert rests with the positioning surface 8 on the supporting surface 7 of the tool seat.

The use of the molded bodies 4 may be explained with reference to FIG. 1. In the illustration in FIG. 1, this is to be explained with reference to the molded body 4 in the "two o'clock position" and to the molded body 4 in the "ten o'clock position" opposite the molded body 4 in the "two o'clock position". The molded bodies 4 are of roughly trapezoidal configuration with a long trapezoid side effective as bearing strip 10. The bearing strip 10 is in each case depicted as reference sign only on the molded bodies 4 explained here in the "two o'clock position" and "ten o'clock position", respectively.

Figure 6A:
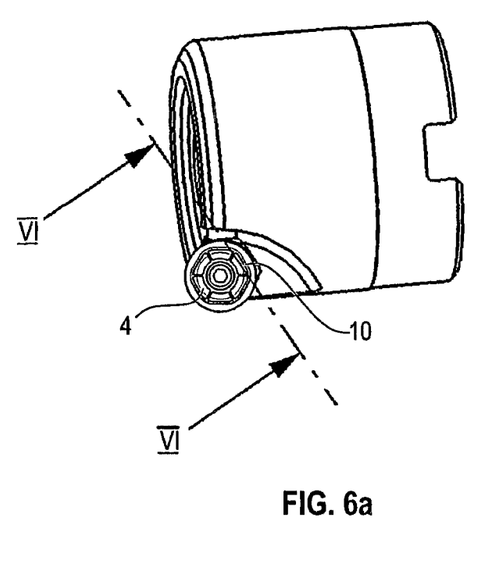
Figure 6B:
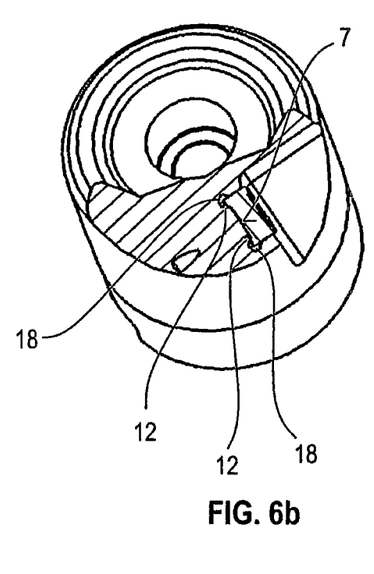

The section VI-VI through the bearing strip 10 of the molded body 4 in the "two o'clock position" or "ten o'clock position" is shown in FIG. 6a. In FIG. 6b, firstly the supporting surface 7 on the insert seat for the indexable cutting insert is shown. The supporting surface 7 is defined in each case by stop edges 12. Either the bearing strips 10 (FIG. 9) or the bearing surfaces 20 (FIG. 8) bear against these stop edges 12 in the insert seat and therefore secure the indexable cutting insert against rotation and also form the indexing for the indexable cutting insert.

To activate the next part of the cutting edge 3 in each case, the bearing surface 20 of the molded body 4 adjacent to the respectively active molded body 4 is brought into engagement with the mating bearing surface 12. This ensures that the respectively active region of the cutting edge 3 always has the same relative position relative to the insert seat and thus also relative to the workpiece during the machining.

Figures 7A, 7B:
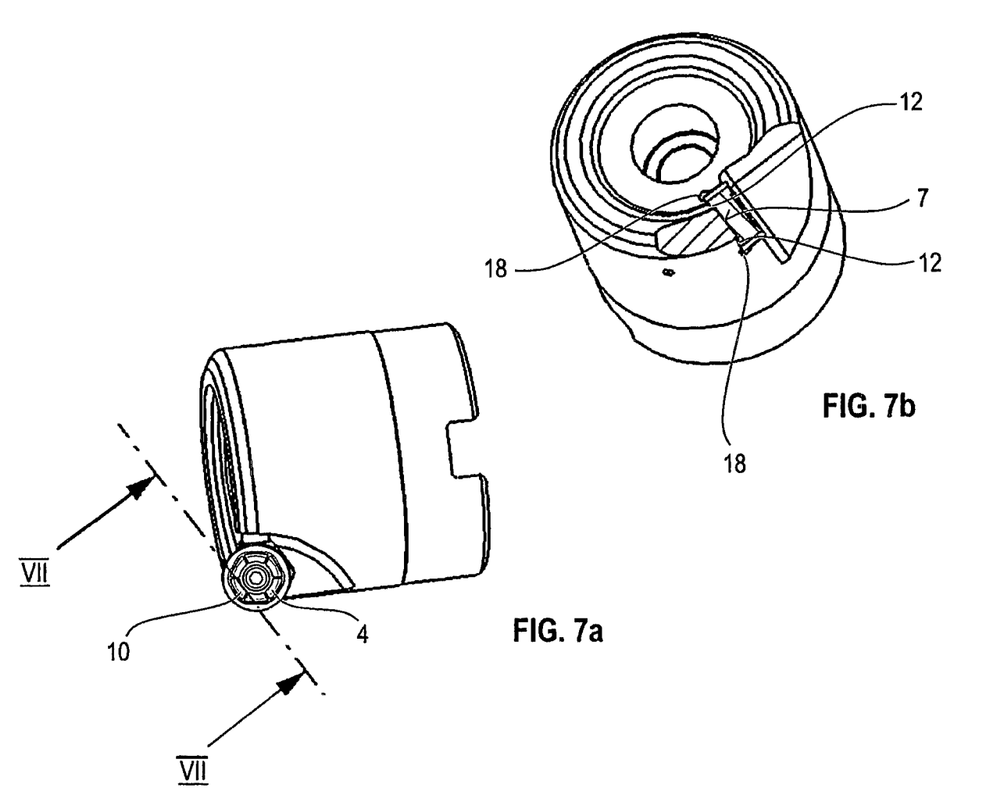

In the section shown in FIG. 6a and FIG. 6b, the effective stop edges 12 of the insert seat are situated well inside the insert seat with respect to the tool. FIG. 7a and FIG. 7b show a section with stop edges 12 which are arranged well to the outside on the tool with respect to the body of the tool. The section VII-VII runs through the bearing strip 10 of the molded body 4 or through the bearing surface 20 of the indexable cutting insert in the "four o'clock position" or "eight o'clock position". The insert seat again has the supporting surface 7 with the stop edges 12. Either the bearing strips 10 (FIG. 9) or the stop surfaces 20 (FIG. 8) bear against these stop edges 12. In addition to the supporting surface 7, a clearance portion 18 for accommodating the cutting edge 3 of the indexable cutting insert can be seen on the insert seat in both FIG. 6b and FIG. 7b.

The machining surface 9 of the indexable cutting insert is tilted relative to the center longitudinal axis 13 of the tool in a preferred embodiment. In this case, the axial angle 14 of the machining surface 9 relative to the center longitudinal axis 13 is of the order of magnitude of 3° to 10°. A tilt angle 14 of 7° is especially preferred. The fastening screw 6 has a screw-in angle 16 within the range of 0° to 10°, preferably 8°, relative to the normal 15 of the center longitudinal axis 13.

The position angle 17 of the insert seat relative to the center longitudinal axis 13 is within the range of 10° to 50°, preferably 30°.

Figure 8:
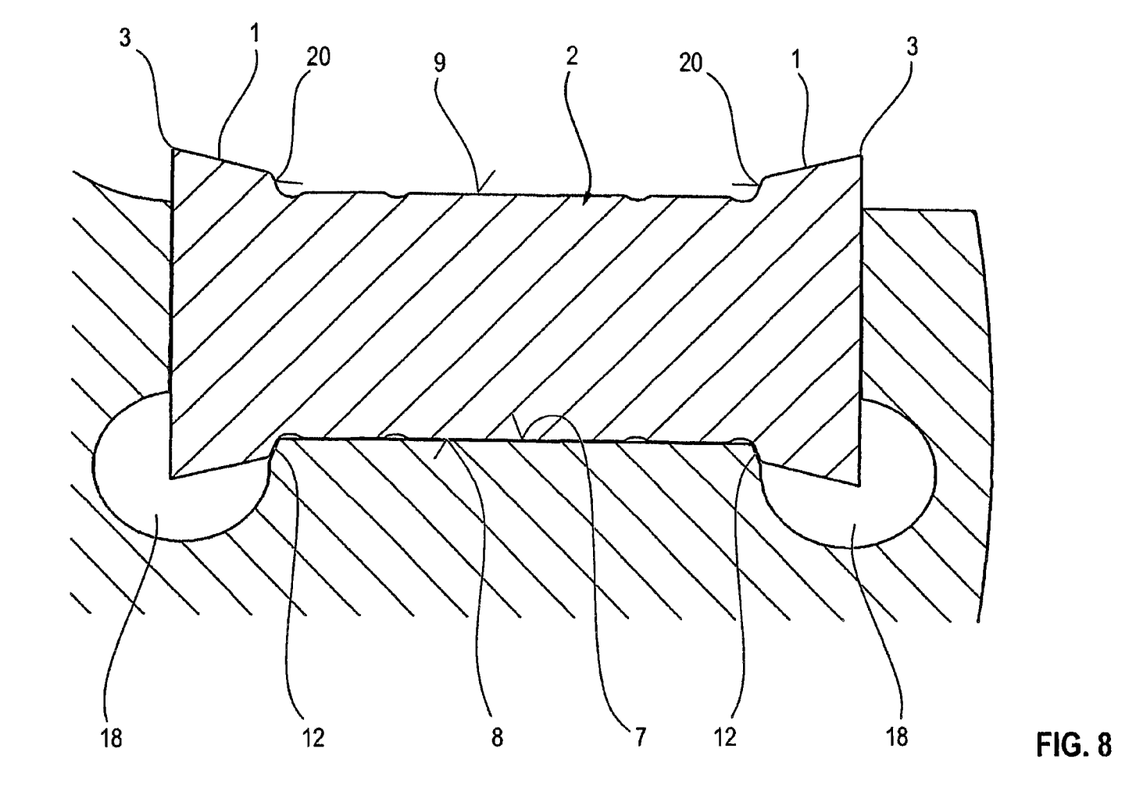

FIG. 8 shows a sectional illustration of a first exemplary embodiment of an indexable cutting insert according to the invention resting in the insert seat. The positioning surface 8 and the machining surface 9 of the indexable cutting insert shown in FIG. 8 are designed to be identical, for which reason the reference numerals applicable to both surfaces are only marked on the machining surface 9 for the sake of better readability. It can be seen from the illustration in FIG. 8 that the indexable cutting insert, with its hollow 2, completely bridges that region of the supporting surface 7 which runs horizontally in FIG. 8. Consequently, with its bearing surfaces 20, which run obliquely from the lip rim 1 in the direction of the hollow 2, the indexable cutting insert bears against that region of the supporting surface 7 which runs out into the clearance portions 18. In this embodiment shown in FIG. 8, the lip rim is preferably configured as a chip breaker.

Figure 9:
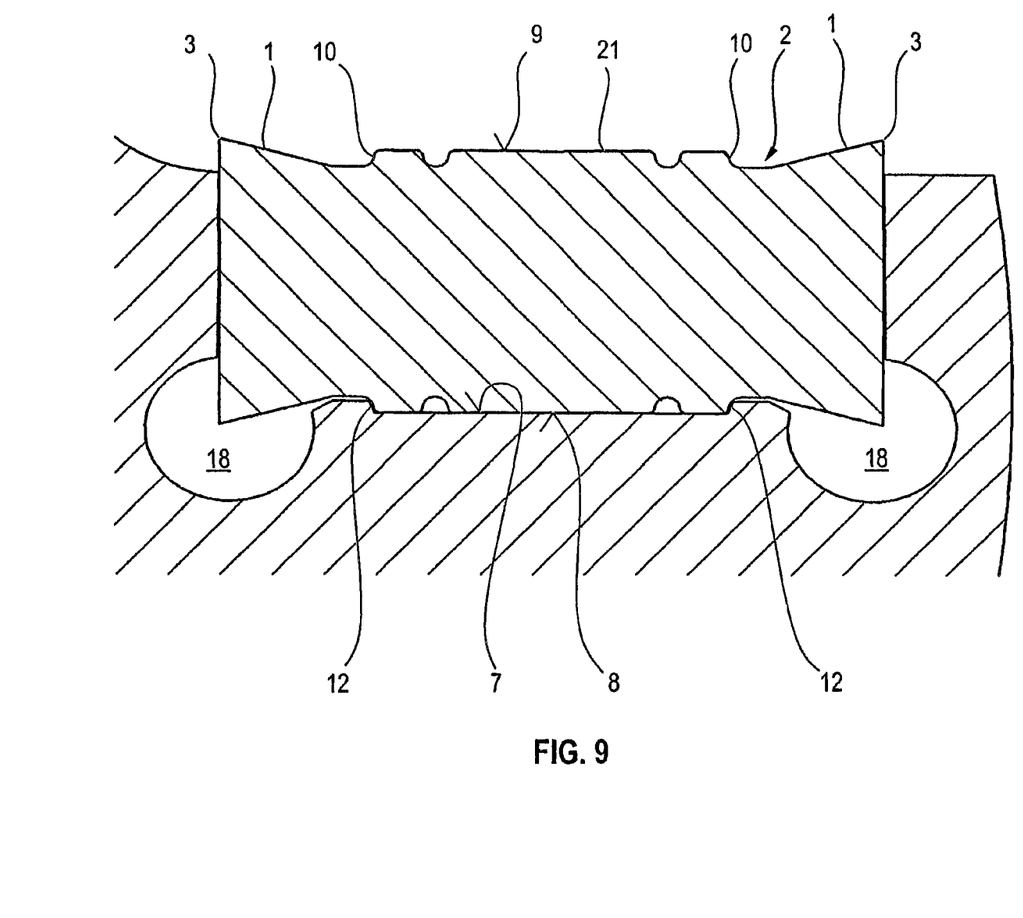
FIG. 9 shows a sectional illustration of a second embodiment of an indexable cutting insert resting in the insert seat.

FIG. 9 shows a second exemplary embodiment in which a relief-like projection 21 is provided in the hollow 2. The relief-like projection 21 has the bearing strips 10 on the indexable cutting insert on its obliquely running side ends. The supporting surface 7 in the insert seat is of bowl-like configuration, such that the projection 21 rising from the positioning surface 8 can engage in the supporting surface 7 of bowl-like configuration. The bearing strips 10 of the indexable cutting insert then bear against the stop edges 12 which form the rims of the bowl-like supporting surface 7.

A plurality of fixing variants are possible with the indexable cutting insert according to the invention. In a first variant (FIG. 8), the positioning surface 8 of the indexable cutting insert covers the entire supporting surface 7 of the insert seat, such that the indexable cutting insert bears with its bearing surface 20 against the stop edges 12 of the insert seat. In a second variant (FIG. 9), the positioning surface 8 of the indexable cutting insert only partly covers the supporting surface of the insert seat, and the bearing strip 10 of the molded body 4 of the indexable cutting insert bears against the associated stop edge 12 of the insert seat. These two aforementioned variants can each be combined with two different insert seat variants: in the first insert seat variant (FIG. 6a/FIG. 6b), the molded bodies (FIG. 9) or the associated bearing surfaces 20 (FIG. 8) of the indexable cutting insert which are arranged, in the final fitted state, in the "two o'clock position", on the one hand, and in the "ten o'clock position", on the other hand, are active for the fixing. Here, the stop strips 10 and bearing surfaces 20, respectively, in the "two o'clock position" and at the same time in the "ten o'clock position" are active. This is the embodiment with fixing of the indexable cutting insert that is effective well inside the tool body. The second insert seat variant relates to fixing of the indexable cutting insert that is arranged well to the outside with respect to the tool body. Here (FIG. 7a/FIG. 7b), the molded bodies 4 (FIG. 9) or the associated bearing surfaces 20 (FIG. 8) of the indexable cutting insert which are arranged, in the final fitted state, in the "four o'clock position" and in the "eight o'clock position" are active. With the indexable cutting insert according to the invention, therefore, a comparatively large number of insert seat configurations of the indexable cutting inserts can be realized, such that a high degree of flexibility is ensured with regard to the application.

The invention claimed is:

1. An insert seat with an indexable cutting insert having two working surfaces facing away from one another and comprising a through-hole extending between the working surfaces for accommodating a fastening bolt, comprising in each case a circumferential lip rim having a cutting edge on each working surface and a central hollow bordered in a ring-like manner by the lip rim and having a number of segment-like molded bodies, corresponding to the number of the different cutting positions of a working surface, for positioning the indexable cutting insert in the respective cutting position, comprising molded bodies having segment-like surfaces in the form of segment-like recesses or segment-like and relief-like projections, wherein the flat surfaces of the molded bodies lie in one plane, and these surfaces extend at an angle of 90° to the center line of the through-hole, wherein the insert seat comprises a supporting surface on the insert seat which faces the positioning surface of the indexable cutting insert and has at least one molded body receptacle, in particular a stop edge on the insert seat, designed to be at least partly complementary to the molded bodies, wherein the indexable cutting insert further includes a bearing surface arranged between the lip rim and the hollow for enabling the indexable cutting insert to bear against the stop edge on the insert seat to securely hold the indexable cutting insert in the insert seat.

2. The insert seat as claimed in claim 1, further including two molded body receptacles, in particular stop edges on the insert seat, which are arranged opposite one another as a pair of molded body receptacles.

3. The insert seat as claimed in claim 1, further including a clearance portion, encircling the supporting surface, on the insert seat as a receiving pocket for the lip rim of the positioning surface resting on the supporting surface.

4. An indexable cutting insert comprising two working surfaces facing away from one another and comprising a through-hole extending between the working surfaces for accommodating a fastening bolt, comprising in each case a circumferential lip rim having a cutting edge on each working surface and a central hollow bordered in a ringlike manner by the lip rim and having a number of segment-like molded bodies, corresponding to the number of the different cutting positions of a working surface, for positioning the indexable cutting insert in the respective cutting position, comprising molded bodies having segment-like surfaces in the form of segment-like recesses or segment-like and relief-like projections, wherein the flat surfaces of the molded bodies lie in one plane, and these surfaces extend at an angle of 90° to the center line of the through-hole, wherein the relief-like projections include a bearing strip for enabling the indexable cutting insert to bear against the stop edge on the insert seat to securely hold the indexable cutting insert in the insert seat.

5. The indexable cutting insert as claimed in claim 4, comprising a trapezoidal outline form of the molded bodies.

6. The indexable cutting insert as claimed in claim 4, wherein the molded bodies are of identical design.

7. The indexable cutting insert as claimed in claim 4, further including a chip breaker at the lip rim.

8. The indexable cutting insert as claimed in claim 4, further including a ring consisting of a CBN cutting material fixed to the lip rim in an integral manner.

9. The indexable cutting insert as claimed in claim 4, further including a ring consisting of a PCD cutting material fixed to the lip rim in an integral manner.

10. The indexable cutting insert according to claim 4, further including two differently fashioned working surfaces for realizing different lip geometries on both indexable cutting insert sides.

11. The indexable cutting insert as claimed in claim 4, wherein one working surface is active as machining surface when the indexable cutting insert is clamped in the tool, and in that the working surface facing away from the machining surface forms a positioning surface for positioning the indexable cutting insert in the insert seat of the tool.

* * * * *